J. M. FALK.
SEWER GAS TRAPS.

No. 180,859. Patented Aug. 8, 1876.

WITNESSES:
C. Neveux
John Goethals

INVENTOR:
John M. Falk
BY Munn & Co
ATTORNEYS.

N. PETERS, PHOTO-LITHOGRAPHER, WASHINGTON, D. C.

UNITED STATES PATENT OFFICE.

JOHN M. FALK, OF NEW YORK, N. Y.

IMPROVEMENT IN SEWER-GAS TRAPS.

Specification forming part of Letters Patent No. 180,859, dated August 8, 1876; application filed May 22, 1876.

*To all whom it may concern:*

Be it known that I, JOHN M. FALK, of the city, county, and State of New York, have invented a new and Improved Sewer-Gas Trap, of which the following is a specification:

The object of this invention is to prevent the escape of gas from the sewers into houses, which the ordinary traps fail to accomplish.

The invention consists of a trap, similar in form to the ordinary trap, or of any other approved form, except that I prefer to make it considerably larger, and preferably to locate it near the sewer, from the upper end of which is an escape-pipe for the gas that may work through the trap, and with or without another trap above the escape-pipe to check the gas escaping through the first trap and cause it to escape through the pipe provided for it, which pipe may discharge in any convenient place—say, in the gutter or into the chimney of the house.

Figure 1:
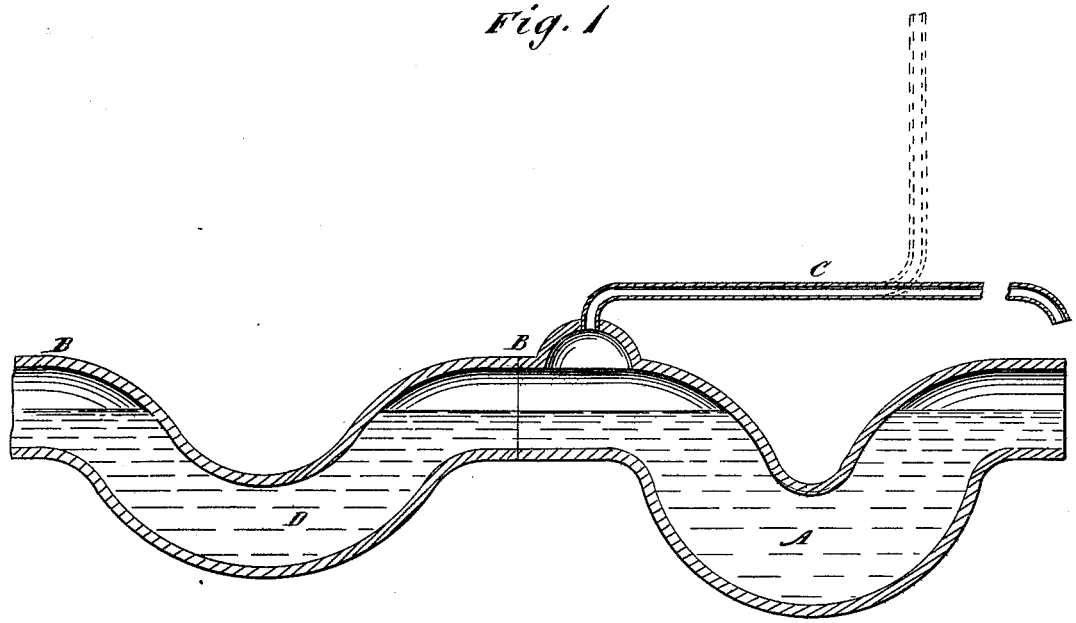
Figure 2:
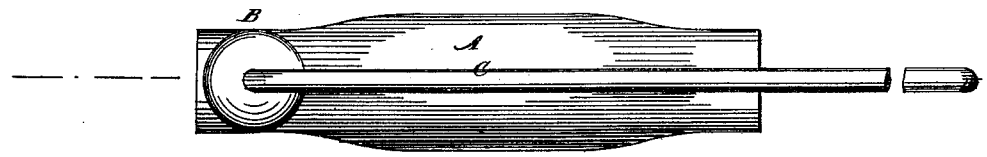

Figure 1 is a longitudinal sectional elevation of my improved trap, taken on the line $x\ x$ of Fig. 1; and Fig. 2 is a plan view.

Similar letters of reference indicate corresponding parts.

A is the trap, which I propose to locate in the waste-pipe B, near the sewer. C is the escape-pipe, which I connect with the pipe B at the upper end of the trap—that is, the end next to the house—and D is the check-trap, which, if preferred or found necessary in some cases, I locate above the escape-pipe, to stop the passage of the gas from the lower trap upward and cause it to escape through the pipe C, which discharges into the atmosphere at the gutter, in the chimney, or at any other convenient place; but the pipe C will generally discharge the gas without the second trap. By thus opening the pipe to the atmosphere for the escape of the gas above the trap A, the upper one is freed from the sewer-pressure, so that the gas cannot pass through the water, as it will to some extent through the lower trap, or any other subject to the pressure in the sewer. The pipe C prevents the siphoning of the traps.

I prefer to widen and enlarge the trap A, to oppose a larger body of water to the gas than the size of the ordinary waste-pipe affords, which I consider has better effect in preventing the escape of the gas. Traps have always been made of uniform size with the pipe, which does not afford sufficient water to stop the gas completely; hence they allow some of the gas to escape, which, it is evident, may be prevented by a sufficient quantity of water.

Having thus described my invention, I claim as new and desire to secure by Letters Patent—

1. A waste-pipe, B, provided with two connected traps, A D, as shown, and for the purpose specified.

2. The combination, with a waste-pipe, B, of an escape-pipe, C, for gas, located between traps A and B in said pipe, substantially as specified.

JOHN M. FALK.

Witnesses:
 T. B. MOSHER,
 ALEX. F. ROBERTS.